(12) United States Patent
Goldberg et al.

(10) Patent No.: US 6,571,232 B1
(45) Date of Patent: May 27, 2003

(54) SYSTEM AND METHOD FOR BROWSING DATABASE SCHEMA INFORMATION

(75) Inventors: Robert N. Goldberg, Redwood City, CA (US); Gloria Y. Lam, Milpitas, CA (US); Seth J. White, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/431,644

(22) Filed: Nov. 1, 1999

(51) Int. Cl.⁷ .............................................. G06F 17/30
(52) U.S. Cl. ........................... 707/2; 207/3; 207/100; 207/102; 207/103 R; 207/1; 717/2
(58) Field of Search ............................. 707/100, 3, 10, 707/102, 103, 1; 717/2

(56) References Cited

U.S. PATENT DOCUMENTS

| | | | |
|---|---|---|---|
| 5,487,141 A | | 1/1996 | Cain et al. |
| 5,499,371 A | * | 3/1996 | Henninger et al. ......... 707/102 |
| 5,504,885 A | | 4/1996 | Alashqur |
| 5,586,311 A | * | 12/1996 | Davies et al. .................. 707/1 |
| 5,644,764 A | * | 7/1997 | Johnson et al. ............. 707/103 |
| 5,692,175 A | * | 11/1997 | Davies et al. .................. 707/3 |
| 5,787,412 A | * | 7/1998 | Bosch et al. ................... 707/2 |
| 5,819,282 A | * | 10/1998 | Hooper et al. .............. 707/100 |
| 5,872,973 A | * | 2/1999 | Mitchell et al. ............. 709/317 |
| 5,937,409 A | | 8/1999 | Wetherbee |
| 5,953,526 A | * | 9/1999 | Day et al. ....................... 717/1 |
| 6,006,224 A | * | 12/1999 | McComb et al. ........... 707/102 |
| 6,047,284 A | * | 4/2000 | Owens et al. ............... 707/102 |
| 6,076,092 A | * | 6/2000 | Goldberg et al. ........... 345/804 |
| 6,081,808 A | * | 6/2000 | Blackman et al. .......... 707/102 |
| 6,199,195 B1 | * | 3/2001 | Goodwin et al. ........... 707/100 |
| 6,212,672 B1 | * | 4/2001 | Keller et al. ................... 717/1 |
| 6,223,184 B1 | | 4/2001 | Blackman et al. |
| 6,263,328 B1 | * | 7/2001 | Coden et al. .................. 707/10 |
| 6,263,341 B1 | * | 7/2001 | Smiley .................... 707/103 R |
| 6,282,547 B1 | * | 8/2001 | Hirsch ........................ 345/804 |
| 6,430,556 B1 | * | 8/2002 | Goldberg et al. .............. 707/4 |
| 6,496,833 B1 | * | 12/2002 | Goldberg et al. ........... 707/102 |

* cited by examiner

Primary Examiner—Greta Robinson
Assistant Examiner—Debbie M. Le
(74) Attorney, Agent, or Firm—Kudirka & Jobse, LLP

(57) ABSTRACT

A query object generator tool which generates interface definitions and code that implement a query object also generates a database schema access query object that retrieves the schema of an underlying database. Instead of retrieving data from the database, the database schema access query object retrieves "metadata", including the names of tables and stored procedures in the database and their descriptions, from the database. The metadata is then displayed as part of a graphic user interface which is used to construct the SQL query implemented by the query object. In accordance with one embodiment of the invention, the database schema access object also verifies that an SQL query generated by a user is valid by submitting the query to the database engine of the underlying database. In accordance with another embodiment of the invention the database schema access object contains methods which perform automatic mapping of "standard" SQL data types to vendor-specific data.

25 Claims, 10 Drawing Sheets

SYSTEM AND METHOD FOR BROWSING DATABASE SCHEMA INFORMATION

FIELD OF THE INVENTION

The present invention relates, in general, to databases and methods for accessing such databases with query objects, and, in particular, to apparatus and methods for interactively examining database information, including database schema information, for the construction of query objects.

BACKGROUND OF THE INVENTION

Databases represent an important data processing area in many applications. They are often used to store large amounts of information and then efficiently retrieve selected portions of the information. Many present day systems use a client/server database approach in which application programs running in clients access a central database management system (DBMS) located in a database server. In order to efficiently access the information in the database, the clients form queries which request information with selected characteristics. The queries are transmitted to the DBMS server which retrieves the desired information which meets the characteristics specified in the query. The results (commonly called a "result set") are returned to the client.

Presently, such database environments are predominantly based on a "two-tiered" model consisting of a top tier containing one or more applications which generate queries that access the DBMS server in a bottom tier. The two-tiered model suffers from several drawbacks. First, the queries must be formulated in a specific query language, which is accepted by the DBMS server. While standard query languages exist, such as the Structured Query Language (SQL), specific DBMS query languages are often non-standard as a result of proprietary extensions made to the basic SQL query language. As a result, application programs written to generate queries in a particular query language are often not portable between different DBMS servers.

In addition, in order to generate the queries in the first place, each application developer, and, in some cases, the ultimate user, must understand the mechanics of the database, including the relationship of the files and tables therein and any relationships in the data required by the database organization. These relationships are commonly referred to as "business logic" since the relationships are typically based on shared business processes, practices and policies. Therefore, many parties must learn the business logic in order to generate meaningful queries.

Further, commonly-performed routines are typically replicated in each application program even if the application programs operate within the same business environment because each application functions autonomously from other applications. This replication results in poor code re-use and maintenance problems if the replicated routines must be changed.

Consequently, there is a trend towards using a three-tiered model for database environments. Generally, the top tier in such a model consists of clients containing the application programs and the user interfaces, the middle tier consists of code that embodies the business logic and the bottom tier consists of the DBMS servers which contain the data. In this model, the applications are implemented as "thin" clients, all of which interface with the business logic by means of a common interface which does not involve knowledge of the business logic. The commonly-performed routines are all consolidated into the middle tier as part of the business logic. Since the business logic is shareable between the clients, code replication is avoided. The Common Object Request Broker Architecture (CORBA) presents one object-oriented approach to forming a three-tiered database environment, such as described in R. Orfali et al., "The Essential Client/Server Survival Guide," pp. 375–458, John Wiley & Sons, Inc. (2d ed. 1996), the disclosure of which is incorporated herein by reference.

Several prior art methods of implementing the three-tiered model exist, however, most existing DBMS access mechanisms and tools, including fourth generation languages (4GLs) and application programming interfaces (APIs), have been designed for the two-tiered model and are ill-suited for use in the three-tiered model. Consequently, several prior art designs including "database" objects and "active data" objects have their own strengths and drawbacks. One promising prior art approach to constructing a middle tier containing business logic uses "query objects." Each query object is a server object that:

(1) translates client method invocations into equivalent queries in a query language which is understood by a database;
(2) issues those queries to the database; and
(3) returns the results as strongly-typed data values.

The query object effectively encapsulates the DBMS specific query language so that the application programs do not have to know or use the DBMS query language. Query objects also encapsulate the database organization or "schema", so that query object clients are isolated from database changes (although the query object itself may have to be changed if the underlying database must be changed.) Query objects also present their clients with a DBMS independent API, for example, CORBA defines an Interface Definition Language (IDL) interface. They do not require that the data be mapped into objects as is the case with active data objects so that significant performance advantages can be obtained and concurrency issues avoided.

Each query object provides as part of its interface one or more parameterized methods and calls on each method are translated by the query object into one or more standard queries such as SELECT, UPDATE, INSERT and DELETE, or into initiation of one or more stored procedures in the database. In order to use the query object, a client first establishes a connection to the query object via some mechanism, such as the CORBA naming service. One of the query object's methods is then invoked and the query object then executes the query.

However, in order to operate properly, the query object must be constructed to generate the correct DBMS queries in response to client requests. Otherwise, the query object may operate as designed, but produce results which are not intended. Constructing a query object to generate the correct queries requires a knowledge of SQL, an understanding of the underlying database schema, the possible handling of intermediate results generated by the query and interpretation of the results. In addition, a query object developer must consider other issues such as connection to the database using CORBA or similar arrangement, concurrency problems and translation required between the interface used by the query object and the API used by the database. Consequently, tools have been developed to automate the generation of query objects. Some tools can generate a query object from a query described in conventional SQL language which is entered, by a user.

However, even with such tools, it may be necessary to understand the schema of the underlying database in order to correctly construct the initial SQL query and map the SQL query into the query language used by the underlying database. Since the database schema is related to the business logic, it is therefore, necessary to understand the business logic at some level. At the very least, the query object developer must obtain the names of tables and stored procedures in the database and their descriptions, including column names and types for tables and input and output parameters for stored procedures. For a particular query, it is also necessary to obtain a description of the result set produced by the query, including numbers and types of result expressions as well as possible bounds on the result set.

Further, the underlying database may use vendor specific data types which do not directly match the standard data types used in SQL expressions. Consequently, it may be necessary to first translate the data types before the query can be used. While these translations are well-known, they can be time-consuming details which distract the user from other, more important work.

Therefore, there is a need to easily obtain and display the database schema and automate testing of the query object, especially objects created with automatic generation tools. There is a further need to test query objects with actual data.

SUMMARY OF THE INVENTION

The foregoing problems are solved in one illustrative embodiment of the invention in which a query object generator tool which generates interface definitions and code that implement a query object can also generate a database schema access query object that retrieves the database schema. Instead of retrieving data from the database, the database schema access query object retrieves "metadata" concerning the database schema from the database. The metadata is then displayed as part of a graphic user interface which is used to construct the SQL query implemented by the query object.

The metadata retrieved by the database schema access object includes, but is not limited to, metadata which is defined for example, in the Java Database Connectivity (JDBC) 2.0 standard, including such data as the names of tables and stored procedures in the database and their descriptions, including column names and types for tables, input and output parameters for stored procedures and information about indexes, primary and foreign key relationships between tables.

In accordance with one embodiment of the invention, the database schema access object also verifies that an SQL query created by a user is valid by submitting the query to the database engine of the underlying database. This submission generates a result set and allows the database schema access object to display to the user a full description of the result set, including the types of resultant attributes as well as possible bounds on the cardinality of the result set.

In accordance with another embodiment of the invention the database schema access object contains methods which perform automatic mapping of "standard" SQL data types to vendor-specific data types so that the internal representation of the query object and most of the query generator tool internal code is not dependent on the underlying DBMS.

BRIEF DESCRIPTION OF THE DRAWINGS

The above and further advantages of the invention may be better understood by referring to the following description in conjunction with the accompanying drawings in which.

DESCRIPTION OF THE PREFERRED EMBODIMENT

Figure 1:
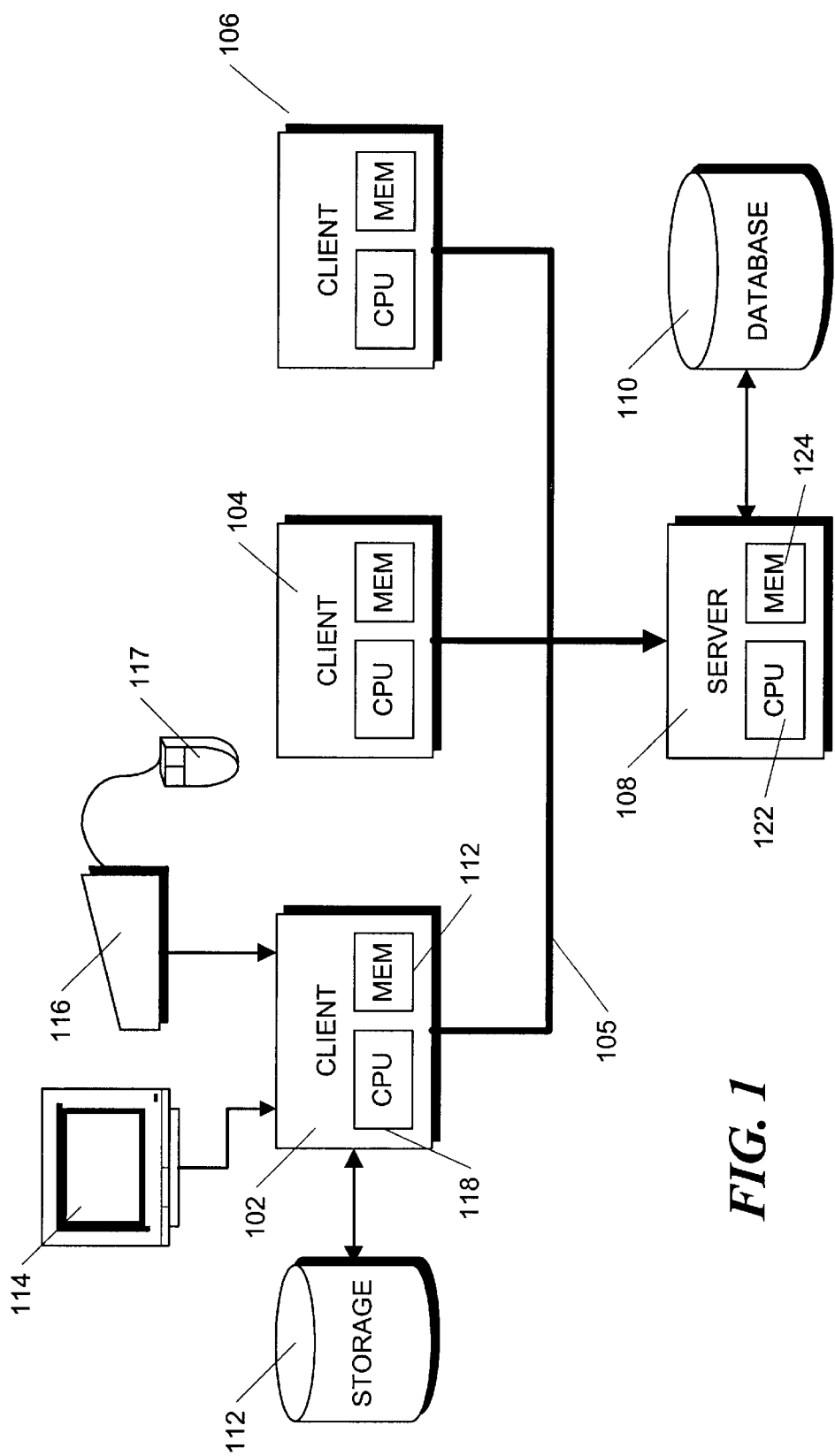
FIG. 1 is a block schematic diagram of a client server system on which the present invention can be operated.

FIG. 1 is a block diagram of a system 100 on which an illustrative query object generator tool constructed according to the present invention can run. As shown, the system 100 is a distributed computing environment comprising a plurality of individual computer nodes 102, 104, 106 and 108. The nodes are functionally organized into clients 102, 104 and 106 and at least one server 108 interconnected over a network 105. However, the clients 102, 104 and 106 and server 108 can also be implemented on a single node. Each node, whether a client 102, 104, 106 or server 108, is a conventionally programmed digital computer, respectively including a central processing unit (CPU) 118, 122, and a main memory 112, 124 interconnected with the CPU 118, 122. In addition, each client 102–106 and server 108 can include user interfacing devices, such as a monitor 114, keyboard 116 and mouse 117 and a storage device 112 (shown in FIG. 1 by way of example, for just one client 102). The server 108 includes a database 110, such as a relational database, file system or other, organized data storage system. The individual components implementing each node 102–108 are interconnected over a central system bus (not shown) used for exchanging address, data and control signals, although other forms of component interconnections are possible. Finally, the system 100 can include devices for accepting computer-readable storage mediums (not shown) and can be interconnected with the network 105 for exchanging data and control signals transmitted as a computer data signal in a carrier wave.

In the described embodiment, each node 102–108 is a network connectable computer, such as a Sun SparcStation™5 workstation running the Solaris™ operating system, a version of the UNIX® operating system, or an IBM-compatible computer running the Windows NT™ operating system. However, use of the systems and processes described and suggested herein are not limited to a particular computer configuration. SparcStation™ and Solaris™ are trademarks of Sun Microsystems, Inc., Mountain View, Calif. UNIX® is a registered trademark of The Open Group, Cambridge, Mass. Windows NT™ is a trademark of Microsoft Corporation, Redmond, Wash.

Figure 2:
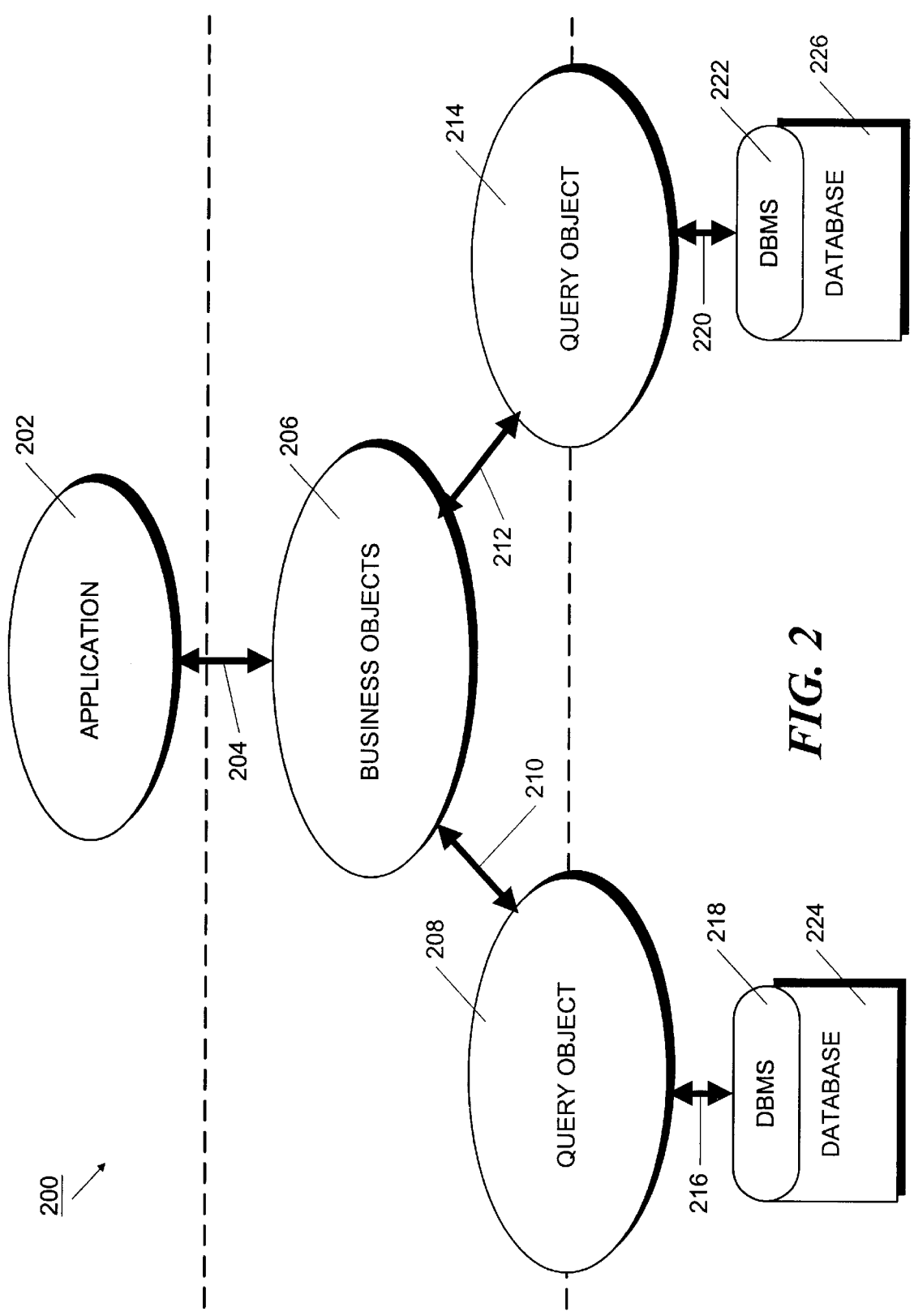
FIG. 2 is a block schematic diagram illustrating the interaction between client object, business objects and query objects in a three-tiered system.

Distributed, computing environments can be logically viewed as a set of cooperating software components, referred to as "objects," being executed on one or more computers interconnected by a network. The individual applications running on each computer can share a set of standard or application-specific objects and executing an application can cause it to interact with and use other software objects available locally and throughout the network. Each such object can, in turn, itself use other software objects. Thus, an application in a distributed computing environment can consist of the combination of application-specific objects and the combined local and remote objects it uses. When one object calls an operation on another object, the calling object is referred to as the "client" while the called object is referred to as the "server." FIG. 2 is a block schematic diagram of a database client/server environment 200 using query objects 208 and 214 as might be implemented in the system 100 of FIG. 1. The environment 200 is functionally structured into three tiers. In the top tier 203, a client 102 (shown in FIG. 1) executes an application 202. The application 202 interacts, as indicated schematically by arrow 204, with business logic in the middle tier 205. The business logic is implemented as one or more business objects 206 (only one business object 206 is shown) and, in turn, interfaces with query objects 208 and 214. Both the business object 206 and the query objects 208 and 214 can be executed on either a client 102 or a server 108 (shown in FIG. 1). Other combinations and configurations of objects, including business object 206 or query object 208 and 214 are feasible.

In the bottom tier 207, a server 108 and an associated database 110 (shown in FIG. 1) include database management systems (DBMS systems) 218 and 222 (which may be executed on the server 108) along with associated databases 224 and 226, respectively. Query objects 208, 214 allow the business logic implemented in the business object 206 to access the DBMS systems 218, 222 without knowledge of the DBMS schema or query language.

More particularly, query objects 208, 214 are server objects that translate client requests into appropriate DBMS queries, issue those queries to the DBMS systems and return the results to the client. Functionally, each query object 208, 214 creates a logical "wrapper" that encapsulates a specific, application-dependent set of queries and provides the results to its clients as strongly typed values. Each query object 208, 214 is associated with a single DBMS system 218, 222, respectively, and has the capability of interacting with specific DBMS query APIs (represented by arrows 216 and 220) and parameters for the queries. However, the query object provides a DBMS-independent API (represented by arrows 210 and 212, respectively) to the business object 206 for accessing the databases 224, 226. Each query object also provides a mechanism for managing connections to the DBMS systems 218, 222 associated with the databases 224, 226, including methods for locating the databases 224, 226 in the distributed environment, methods for logging on to the DBMS systems 218, 222 and facilities for managing the connection resources. A query object may also provide multi-threading support, if necessary.

Each query object may include several distinct queries. The query object code for each query is created by a query object generator tool in response to a query written by the query object developer in a standard language, such as SQL. In order to assist the developer in writing the SQL language queries, the query object generator tool utilizes the inventive database schema access object to retrieve and to display the schema of the underlying database to the developer. Since the database schema access object is closely tied to the underlying database, the database schema access object also serves as a repository of code to perform other database-related activities. These activities include, submitting a proposed query to the underlying database query engine in order to validate the query and performing data type translations between the SQL data types used in the developer-formulated queries and the vender-specific data types of the underlying database.

Figure 3:
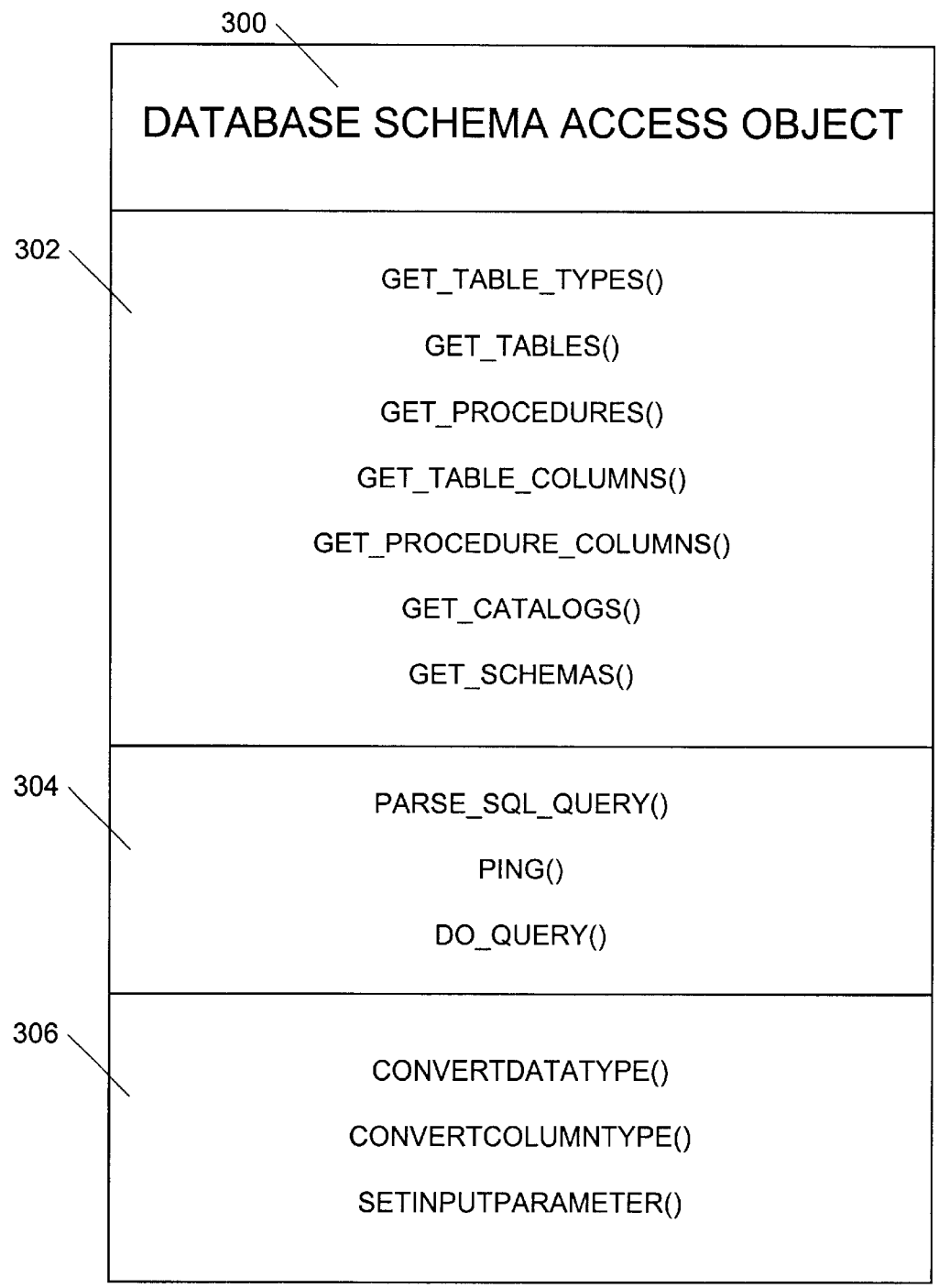
FIG. 3 illustrates the internal organization of a database schema access object illustrating methods for browsing database schema, validating a query and translating data types.

The general internal organization of a database schema access object is shown in FIG. 3. In particular, the database schema access object, 300, contains a plurality of methods, which are called by the query object generator tool. These methods fall into three distinct groups. The first group, 302, contains methods which are used to retrieve information from the underlying database, including table types, tables, procedures, table columns, procedure columns, catalogs, and database schema.

The second method group 304, contains methods which are used to validate an SQL language query entered by the query object developer. These latter methods include the parse_SQL_query( ) method, which is used to validate the SQL input query and determine its result set and input parameters. The ping( ) method is used to validate a connection to the underlying database and the Do_Query( ) method which is used to execute a query by means, of the underlying database query engine in order to perform DDL operations (such as creating and deleting tables), creating stored procedures, etc. The parse_SQL_query( ) method contains an automated rollback mechanism to prevent the query from actually being executed and changing the data since the query is being validated for later use in the query object.

The third group of methods, 306, includes methods which convert data types, column types and input parameters of the SQL input query to the data types, column types and input parameters of the vender-specific database.

Figure 4:
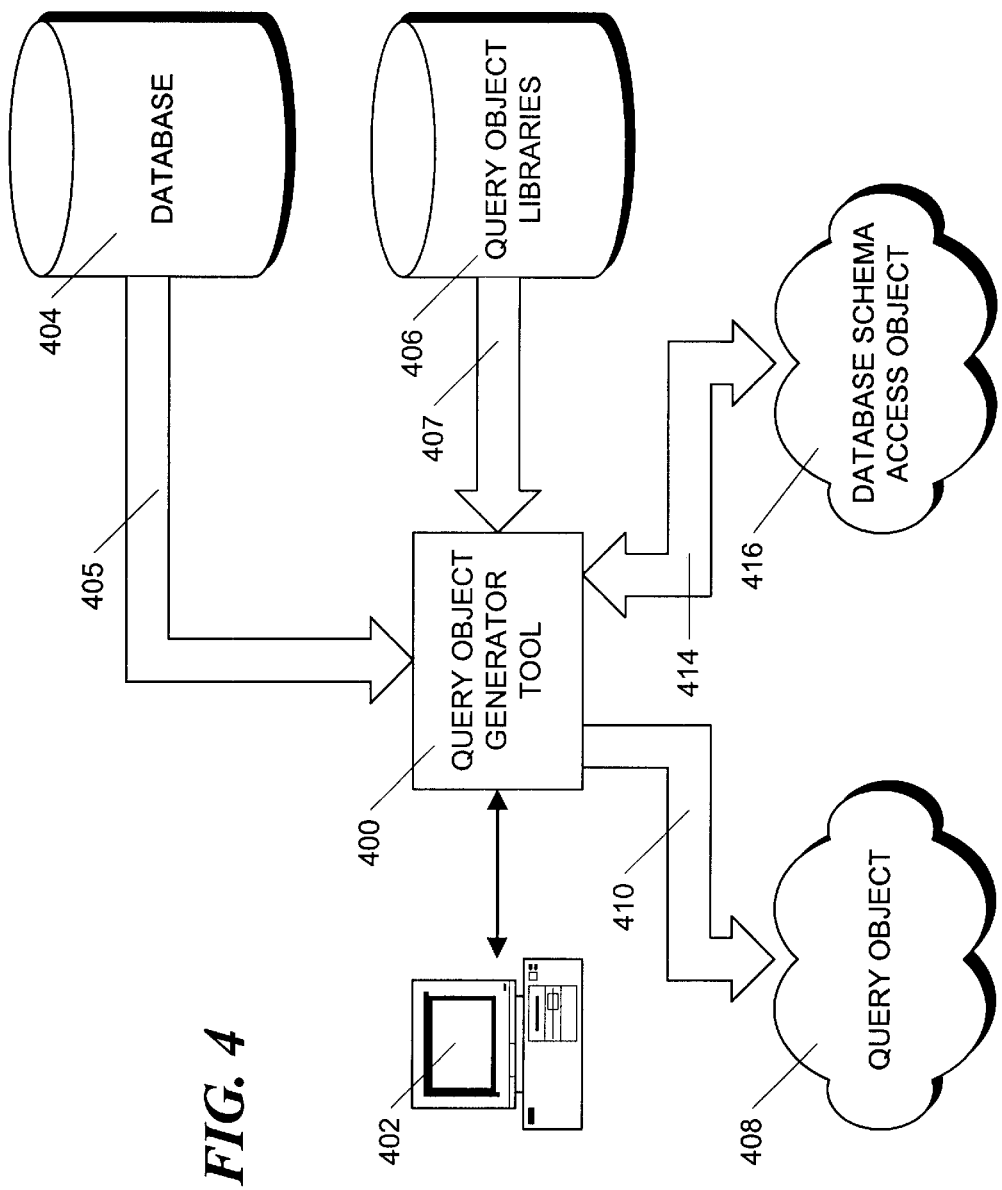
FIG. 4 illustrates the generation of a query object and a database schema access object from information in the underlying database and query object library files.

The database schema access object can be hand coded by a developer or generated by an automated query object generator tool. FIG. 4 illustrates the operation of a generator tool which generates the components, of a query object and, optionally, the components of a database schema access object as illustrated in FIG. 3. In particular, the query object generator tool 400 utilizes information obtained from database 404 and query object libraries 406 to construct a query object 408. The query object generator tool 400 includes a mechanism (not shown) for obtaining the database schema from database 400 as indicated schematically by arrow 405. The database schema may be presented to a user by means of an optional GUI 402 to aid the user in formulating a query which is consistent with the database schema. When the query information has been obtained from the user, the query object generator tool 400 utilizes object-oriented class code found in the query object library 406 to instantiate code generator objects (not shown) as indicated schematically by arrow 407. The code generator objects then generate the source code for the query object 408 as indicated by arrow 410. The code generators may also generate build scripts (not shown) which allow the query object 408 to be built from the generated source code.

The code generators also use the information obtained from database 404 and libraries 406 to generate a test object 416 as indicated by arrow 414. The test object corresponds to the query object 408. A set of the query test objects 418 is also generated as indicated by arrow 412 and each of the query objects corresponds to one of the queries in the query object 408. Both the test object 416 and the query objects 418 are used with the inventive test framework to generate a test GUI which can display and run the queries in a query object as described below.

In the preferred embodiment, the client/server environment 200 is implemented in compliance with the Common Object Request Broker Architecture (CORBA), such as described in "The Common Object Request Broker: Architecture and Specification," Rev. 2.0, Object Management Group, Inc. (July 1995), the disclosure of which is incorporated herein by reference. The application 202, business object 206 and query objects 208, 214 each export an API defined in Interface Definition Language (IDL) and interface with each other via an associated Object Request Broker (ORB) illustrated in FIG. 5. Each query object 208, 214 returns a set of IDL structures whose type is derived from the database schema at the time the query object 208, 214 is implemented and this interface is used by clients of the query object. In a similar manner the test object and each of the query test objects also export an IDL interface which insures that they will be compatible with the test framework.

Figure 5:
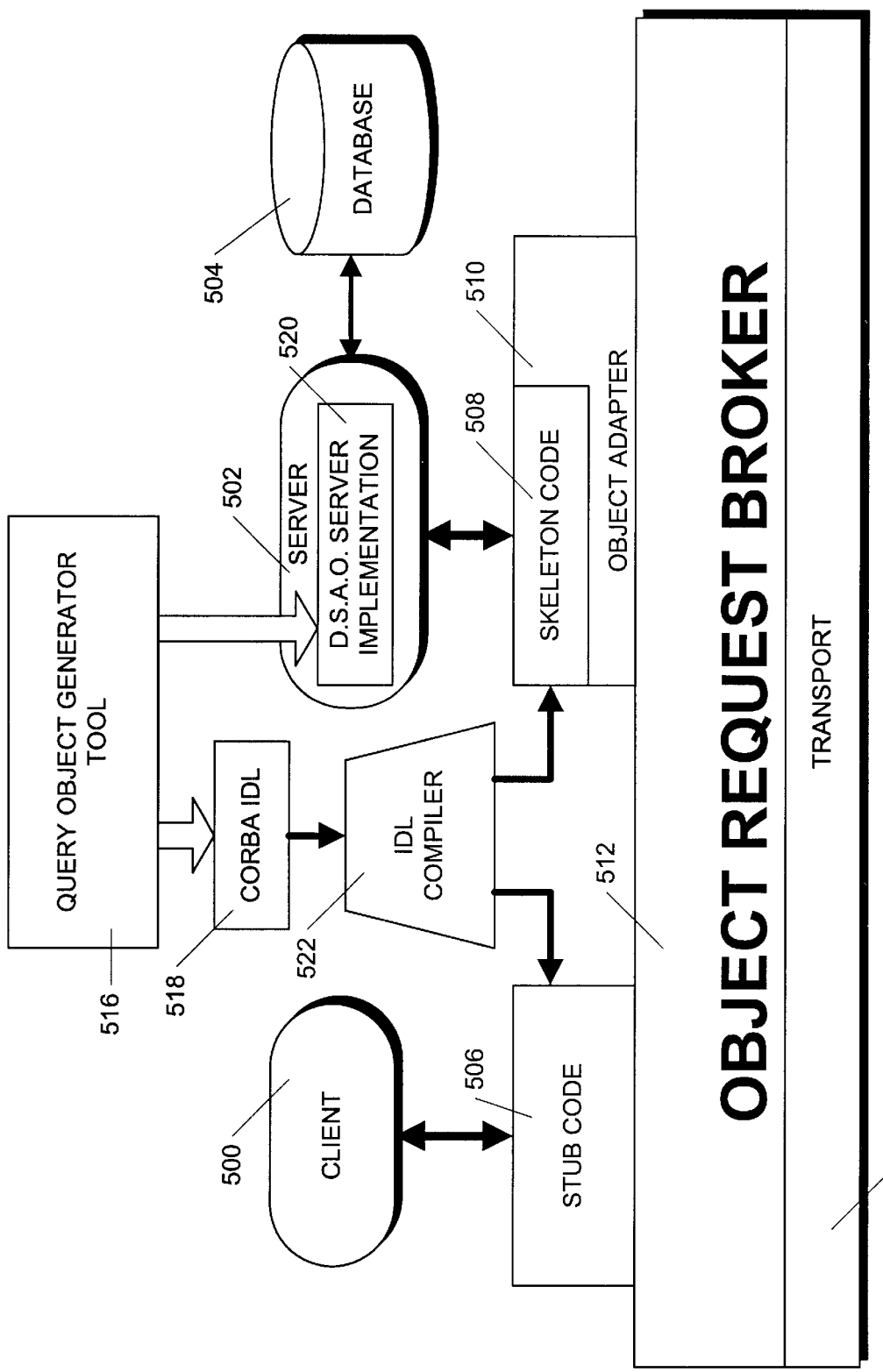
FIG. 5 illustrates how code generated by a query object generator tool is used with a CORBA distributed object system.

FIG. 5 illustrates, in a very schematic form, the basic CORBA architecture which defines a peer-to-peer distributed computing facility where all applications are objects (in the sense of object orientation). In such a system, a client 500 communicates with the server 502 by means of an object request broker or ORB 512. an object, such as a database schema access object can be located on the server 502. The ORB 512 operates with a transport 514 that conveys information between the client 500 and server 502. The client 500 communicates with the ORB 512 by means of the aforementioned IDL interface and a reference to the query object or the test object. The database schema access object reference, in turn, contains an identification of the schema access object implementation 520 in the server 502 so that the server 502 can pass a request to the correct object implementation. The schema access object implementation 520 communicates with a database 504 to retrieve data and interact with the database engine to retrieve the database metadata and validate queries under control of the generator tool.

The entire CORBA architecture is actually implemented in a conventional programming language, such as C, C++, Smalltalk or the JAVA™ programming language. Implementations in a variety of languages are available from a number of vendors who typically provide a compiler, called an IDL compiler 522, bundled with their ORB products. The compiler 522 generates header files which define the OMG IDL interfaces and can be incorporated into application programs. The compilers also generate the client stub code 506 and the server skeleton code 508 for each interface.

The client 500, which may be the generator tool, can directly link to the OMG IDL stub code 506. As far as the client is concerned, an invocation of the stub code 506 appears to be a local function call. Once invoked, the stub code 506 provides an interface to the ORB 512 that encodes the operation's parameters into communication formats suitable for transmission on the transport 514 to the server 502. The stub code then transmits a request for service to the server 502.

At the server side, the OMG IDL skeleton code 508 is the corresponding implementation of the OMG IDL interface. When the ORB 512 receives a request, the skeleton code 508 decodes the request parameters and generates a call to the schema access object implementation 525 in the server 502. When the server completes processing of the request, the skeleton code 508 and stub code 506 return the results to the client 500. If an error has occurred, exception information generated by the server or by the ORB is returned. An object adapter 510 comprises the interface between the ORB 512, the skeleton code 508 and the server 520. Object adapters, such as adapter 510, support functions, such as registration of object implementations and activation of servers.

The query object generator tool generates a query object. Initially, the query object generator tool, needs a database schema access object to operate, but after a database schema access object has been obtained, the tool can generate other database schema access objects. The initial database schema access object may be obtained by means of a number of methods, such as hand coding. The query object generator tool preferably generates both a query object and a database schema access object for use with a conventional CORBA system such as that illustrated in FIG. 5. When operating with such a CORBA system, the query object generator tool 516 generates CORBA IDL interface code 518. This IDL code is applied to a conventional IDL compiler 522 which, in turn, generates the client stub code 506 and the server skeleton 508.

An example of generic IDL code generated by the query object generator tool 516 for a database schema access object is illustrated in the following code snippet:

```
module SchemaAccessModule {
    exception ErrorDuringQuery { long error_code; string details; };
    struct DB_object {
        string name;
        string owner;
        string type;
    };
    typedef sequence <DB_object> DB_objects;
    struct DB_column {
        string name;
        string type;
    };
    typedef sequence <DB_column> DB_columns;
    // The following list of types is from the SQL92 ANSI Standard.
    enum SQL_type {
                    ILLEGAL,
                    CHARACTER,
                    CHARACTERVARYING,
```

-continued

```
                    BIT,                    // or BYTE
                    BITVARYING,             // or BYTEVARYING
                    NUMERIC,
                    DECIMAL,
                    INTEGER,
                    SMALLINT,
                    FLOAT,
                    REAL,
                    DOUBLEPRECISION,
                    DATE,
                    TIME,
                    TIMESTAMP,
                    INTERVAL,
                    CHARACTERBLOB,          // Not an SQL92 type
                    BITBLOB                 // Not an SQL92 type
    };
    struct Column_dscr {
        string          col_name;
        string          type_name;
        SQL_type        type_code;
        short           type_len;
        short           type_var;
        short           type_scale;
    };
    typedef sequence <Column_dscr> Column_dscrs;
    enum Query_keyword {
                    INVALID_QUERY,
                    SELECT_QUERY,
                    INSERT_QUERY,
                    UPDATE_QUERY,
                    DELETE_QUERY,
                    STORED_PROCEDURE_QUERY
    };
    struct Query_dscr {
        Query_keyword       query_type;
        string          error_message;
        Column_dscrs        query_columns;
        Column_dscrs        procedure_inputs;       // stored procedures only
    };
    interface DBQuery {
        // Returns the top-level database objects
        DB_objects get_DB_objects(
            in string server,
            in string dbname,
            in string user,
            in string passwd)
          raises(ErrorDuringQuery);
        DB_columns get_DB_columns(
            in string server,
            in string dbname,
            in string user,
            in string passwd,
            in string objname)
          raises(ErrorDuringQuery);
        // Parses an SQL query and returns a description
        Query_dscr parse_SQL_query( in string server,
            in string dbname,
            in string user,
            in string passwd,
            in string query )
          raises(ErrorDuringQuery);
    };
};
```

The IDL code defines database structures and constants. The listed methods retrieve database objects, such as table types, tables, procedures and catalogs, and columns, such as table columns and procedure columns, and parse an SQL query.

In addition, the query object generator tool 516 generates source code for the server implementation of the database schema access object 525 in the program language used in the CORBA system. The CORBA IDL code 518 is written in standard IDL language. However, the CORBA server implementation 525 must be written in a language used on the server 502. This may, for example, be C++ or Java or some other language which is suitable for implementation on server 502. A code snippet illustrating implementation source code for a database schema access object named DBQueryImpl which implements the DBQuery interface described above appears as follows. This source code has been written in the JAVA™ programming language.

```
package GOLD.SchemaAccessModule;
import java.sql.*;
import java.util.*;
import org.omg.CORBA.*;
import org.omg.CosNaming.*;
import org.omg.CosNaming.NamingContextPackage.*;
import QueryObject.*;
import GOLD.QoLib.*;
public class DBQueryImpl extends _DBQueryImplBase {
public static void SetConnectionManager(ConnectionManager cm) {
    connectionManager = cm;
}
pubiic static ConnectionManager getConnectionManager( ) {
    if ( connectionManager==null )
        connectionManager = new ConnectionCache(1);
    return connectionManager;
}
public DBQueryImpl( String url )
{
    defaultUrl = url;
    /* this.DBQueryImplToOrb = DBQueryImplToOrb; */
}
public DBQueryImpl( )
{
    defaultUrl = null;
    /* this.DBQueryImplToOrb = DBQueryImplToOrb; */
}
public
String[ ] get_table_types(ConnectionInfo connectionInfo)
    throws ConnectionError, ErrorDuringQuery
{
    String[ ] result = null;
    ConnectionHandle conHandle = null;
    ResultSet rs = null;
    Vector tempResult;
    DatabaseMetaData md;
    boolean reTry = true;
    int retryCount = 0;
    QORuntime.initUrl(connectionInfo, defaultUrl);
    do {
        try {
            conHandle = getConnectionManager( ).getConnectionHandle(connectionInfo);
        }
        catch ( ConnectionError ex ) {
            if ( retryCount < getConnectionManager( ).getMaxRetries( ) ) {
                retryCount++;
                continue;
            }
            else {
                throw ex;
            }
        }
        try {
            md = conHandle.getConnection( ).getMetaData( );
            rs = md.getTableTypes( );
        }
        catch ( SQLException ex ) {
            getConnectionManager( ).releaseAfterException(conHandle);
            if ( retryCount < getConnectionManager( ).getMaxRetries( ) ) {
                retryCount++;
                continue;
            }
            else {
                throw new ErrorDuringQuery(ex.getErrorCode( ), ex.toString( ));
            }
        }
        reTry = false;
    } while (reTry);
    try {
        tempResult = new Vector(10, 10);
        while ( rs.next( ) ) {
            String table_type = rs.getString(1).trim( );
            tempResult.addElement(table_type);
        }
        result = new String[ tempResult.size( ) ];
        for (int i = 0; i < tempResult.size( ); i++) {
            result[i] = (String)tempResult.elementAt(i);
        }
    }
```

-continued

```
catch (SQLException ex) {
    try { rs.close( ); } catch (SQLException e){ }
    getConnectionManager( ).releaseAfterException(conHandle);
    throw new ErrorDuringQuery(ex.getErrorCode( ), ex.toString( ));
}
try { rs.close( ); }
catch (SQLException ex) {
        getConnectionManager( ).releaseAfterException(conHandle);
        return result;
    }
    getConnectionManager( ).releaseConnectionHandle(conHandle);
    return result;
}
public
Table[ ] get_tables(
                    ConnectionInfo connectionInfo,
                    String catalog,
                    String schemaPattern,
                    String tablePattern,
                    String[ ] types)
    throws ConnectionError, ErrorDuringQuery
{
    Table[ ] result = null;
    ConnectionHandle conHandle = null;
    ResultSet rs = null;
    Vector tempResult;
    DatabaseMetaData md;
    boolean reTry = true;
    int retryCount = 0;
    QORuntime.initUrl(connectionInfo, defaultUrl);
    do {
        try {
            conHandle = getConnectionManager( ).getConnectionHandle(connectionInfo);
        }
        catch (ConnectionError ex ) {
            if ( retryCount < getConnectionManager( ).getMaxRetries( ) ) {
                retryCount++;
                continue;
            }
            else {
                throw ex;
            }
        }
        try {
            md = conHandle.getConnection( ).getMetaData( );
            rs = md.getTables((catalog.equals(" ")?null:catalog),
                    schemaPattern,
                    tablePattern,
                    (types.length==0?null:types));
        }
        catch (SQLException ex) {
            getConnectionManager( ).releaseAfterException(conHandle);
            if ( retryCount < getConnectionManager( ).getMaxRetries( ) ) {
                retryCount++;
                continue;
            }
            else {
                throw new ErrorDuringQuery(ex.getErrorCode( ), ex.toString( ));
            }
        }
        reTry = false;
    } while (reTry);
    try {
        tempResult = new Vector(100, 100);
        while ( rs.next( ) ) {
            String catalog_name = rs.getString(1);
            catalog_name = (catalog_name==null?" ":catalog_name.trim( ));
            String schema_name = rs.getString(2);
            schema_name = (schema_name==null?" ":schema_name.trim( ));
            String table_name = rs.getString(3);
            table_name = (table_name==null?" ":table_name.trim( ));
            String table_type = rs.getString(4);
            table_type = (table_type==null?" ":table_type.trim( ));
            String remarks = rs.getString(5);
            remarks = (remarks==null?" ":remarks.trim( ));
            Table row = new Table(table_name, schema_name,
                    catalog_name, table_type, remarks);
            tempResult.addElement( row );
        }
```

-continued

```
        result = new Table[ tempResult.size( ) ];
        for (int i = 0; i < tempResult.size( ); i++) {
            result[i] = (Table)tempResult.elementAt(i);
        }
    }
    catch (SQLException ex) {
        try { rs.close( ); } catch (SQLException e) { }
        getConnectionManager( ).releaseAfterException(conHandle);
        throw new ErrorDuringQuery(ex.getErrorCode( ), ex.toString( ));
    }
    try { rs.close( ); }
    catch (SQLException ex) {
        getConnectionManager( ).releaseAfterException(conHandle);
        return result;
    }
    getConnectionManager( ).releaseConnectionHandle(conHandle);
    return result;
}
public
Procedure[ ] get_procedures(ConnectionInfo connectionInfo,
                    String catalog,
                    String schemaPattern,
                    String procedurePattern)
    throws ConnectionError, ErrorDuringQuery
{
    Procedure[ ] result = null;
    ConnectionHandle conHandle = null;
    ResultSet rs = null;
    Vector tempResult;
    DatabaseMetaData md;
    boolean reTry = true;
    int retryCount = 0;
    QORuntime.initUrl(connectionInfo, defaultUrl);
    do {
        try {
            conHandle = getConnectionManager( ).getConnectionHandle(connectionInfo);
        }
        catch ( ConnectionError ex ) {
            if ( retryCount < getConnectionManager( ).getMaxRetries( ) ) {
                retryCount++;
                continue;
            }
            else {
                throw ex;
            }
        }
        try {
            md = conHandle.getConnection( ).getMetaData( );
            rs = md.getProcedures((catalog.equals(" ")?null:catalog),
                        schemaPattern,
                        procedurePattern);
        }
catch (SQLException ex) {
        getConnectionManager( ).releaseAfterException(conHandle);
        if ( retryCount < getConnectionManager( ).getMaxRetries( ) ) {
            retryCount++;
            continue;
        }
        else {
            throw new ErrorDuringQuery(ex.getErrorCode( ), ex.toString( ));
        }
    }
    reTry = false;
} while (reTry);
try {
    tempResult = new Vector(100, 100);
    while ( rs.next( ) ) {
        String catalog_name = rs.getString(1);
        catalog_name = (catalog_name==null?" ":catalog_name.trim( ));
        String schema_name = rs.getString(2);
        schema_name = (schema_name==null?" ":schema_name.trim( ));
        String procedure_name = rs.getString(3);
        procedure_name = (procedure name==null?" ":procedure_name.trim( ));
        short procedure_type = rs.getShort(8);
        String remarks = rs.getString(7);
        remarks = (remarks==null?" ":remarks.trim( ));
        Procedure row = new Procedure(procedure_name, schema_name,
                    catalog_name, procedure_type, remarks);
        tempResult.addElement( row );
```

```
        }
            result = new Procedure[ tempResult.size( ) ];
            for (int i = 0; i < tempResult.size( ); i++) {
                result[i] = (Procedure)tempResult.eiementAt(i);
            }
        }
        catch (SQLException ex) {
            try { rs:close( ); } catch (SQLException e) { }
            getConnectionManager( ).releaseAfterException(conHandle);
            throw new ErrorDuringQuery(ex.getErrorCode( ), ex.toString( ));
        }
        try { rs.close( ); }
        catch (SQLException ex) {
            getConnectionManager( ).releaseAfterException(conHandle);
            return result;
        }
        getConnectionManager( ).releaseConnectionHandle(conHandle);
        return result;
}
public
TableColumn[ ] get table_columns(ConnectionInfo connectionInfo,
                        String catalog,
                        String schemaPattern,
                        String tablePattern,
                        String columnPattern)
    throws ConnectionError, ErrorDuringQuery
{
    TableColumn[ ] result = null;
    ConnectionHandle conHandle = null;
    ResultSet rs = null;
    Vector tempResult;
    DatabaseMetaData md;
    boolean reTry = true;
    int retryCount = 0;
    QORuntime.initUrl(connectionInfo, defaultUrl);
    do {
        try {
            conHandle = getConnectionManager( ).getConnectionHandle(connectionInfo);
        }
        catch (ConnectionError ex ) {
            if ( retryCount < getConnectionManager( ).getMaxRetries( ) ) {
                retryCount++;
                continue;
            }
            else {
                throw ex;
            }
        }
        try {
            md = conHandle.getConnection( ).getMetaData( );
            rs = md.getColumns((catalog.equals(" ")?null:catalog),
                    schemaPattern,
                    tablePattern,
                    columnPattern);
        }
        catch (SQLException ex) {
            getConnectionManager( ).releaseAfterException(conHandle);
            if ( retryCount < getConnectionManager( ).getMaxRetries( ) ) {
                retryCount++;
                continue;
            }
            else {
                throw new ErrorDuringQuery(ex.getErrorCode( ), ex.toString( ));
            }
        }
        reTry = false;
    } while (reTry);
try {
    tempResult new Vector(100, 100);
    while ( rs.next( ) ) {
        String catalogName = rs.getString(1);
        catalogName = (catalogName==null?" ":catalogName);
        String schemaName = rs.getString(2);
        schemaName = (schemaName==null?" ":schemaName);
        String tableName = rs.getString(3).trim( );
        String columnName = rs.getString(4).trim( );
        String dataType = convertDataType(rs.getInt(5));
        String typeName = rs.getString(6);
        typeName = (typeName==null?" ":typeName);
```

```
                int columnSize = rs.getInt(7);
                int decimalDigits = rs.getInt(9);
                int radix = rs.getInt(10);
                boolean nullable =
                        (rs.getInt(11)==DatabaseMetaData.columnNullable?true:false);
                String remarks = rs.getString(12);
                remarks = (remarks==null?" ":remarks);
                String columnDefault = rs.getString(13);
                columnDefault = (columnDefault==null?" ":columnDefault);
                int charLength = rs.getInt(14);
                int ordPosition = rs.getInt(15);
                TableColumn row = new TableColumn(columnName, tableName, schemaName,
                                catalogName, dataType, typeName,
                                columnSize, decimalDigits, radix,
                                nullable, remarks, columnDefault,
                                charLength, ordPosition);
                tempResult.addElement( row );
            }
            result = new TableColumn[ tempResult.size( ) ];
            for (int i = 0; i < tempResult.size( ); i++) {
                result[i] = (TableColumn)tempResult.elementAt(i);
            }
    }
    catch (SQLException ex) {
        try { rs.close( ); } catch (SQLException e) { }
        getConnectionManager( ).releaseAfterException(conHandle);
        throw new ErrorDuringQuery(ex.getErrorCode( ), ex.toString( ));
    }
    try { rs.close( ); }
    catch (SQLException ex) {
        getConnectionManager( ).releaseAfterException(conHandle);
        return result;
    }
    getConnectionManager( ).releaseConnectionHandle(conHandle);
            return result;
        }
        public
        ProcedureColumn[ ] get_procedure_columns(ConnectionInfo connectionInfo,
                            String catalog,
                            String schemaPattern,
                            String procedurePattern,
                            String columnPattern)
        throws ConnectionError, ErrorDuringQuery
{
        ProcedureColumn[ ] result = null;
        ConnectionHandle conHandle = null;
        ResultSet rs = null;
        Vector tempResult;
        DatabaseMetaData md;
        boolean reTry = true;
        int retryCount = 0;
        QORuntime.initUrl(connectionInfo, defaultUrl);
        do {
            try {
                conHandle = getConnectionManager( ).getConnectionHandle(connectionInfo);
            }
            catch (ConnectionError ex ) {
                if ( retryCount < getConnectionManager( ).getMaxRetries( ) ) {
                    retryCount++;
                    continue;
                }
                else {
                    throw ex;
                }
            }
            try {
                md = conHandle.getConnection( ).getMetaData( );
                rs = md.getProcedureColumns((catalog.equals(" ")?null:catalog),
                        schemaPattern,
                        procedurePattern,
                        columnPattern);
            }
            catch (SQLException ex) {
                getConnectionManager( ).releaseAfterException(conHandle);
                if ( retryCount < getConnectionManager( ).getMaxRetries( ) ) {
                    retryCount++;
                    continue;
                }
                else {
```

```
                throw new ErrorDuringQuery(ex.getErrorCode( ), ex.toString( ));
            }
        }
        reTry = false;
    } while (reTry);
    try {
        tempResult = new Vector(100, 100);
        while ( rs.next( ) ) {
            String catalogName = rs.getString(1);
            catalogName = (catalogName==null?" ":catalogName);
            String schemaName = rs.getString(2);
            schemaName = (schemaName==null?" ":schemaName);
            String procedureName = rs.getString(3).trim( );
            String columnName = rs.getString(4).trim( );
            String columnType = convertColumnType(rs.getShort(5));
            String dataType = convertDataType(rs.getInt(6));
            String typeName = rs.getString(7);
            typeName = (typeName==null?" ":typeName);
            int precision = rs.getInt(8);
            int length = rs.getInt(9);
            short scale = rs.getShort(10);
            short radix = rs.getShort(11);
            boolean nullable =
                (rs.getInt(12)==DatabaseMetaData.columnNullable?true:false);
            String remarks = rs.getString(13);
            remarks = (remarks==null?" ":remarks);
            ProcedureColumn row =
                new ProcedureColumn(columnName, procedureName, schemaName,
                        catalogName, columnType, dataType, typeName,
                        precision, length, scale,
                        radix, nullable, remarks);
            tempResult.addElement( row );
        }
        result = new ProcedureColumn[ tempResult.size( ) ];
        for (int i = 0; i < tempResult.size( ); i++) {
            result[i] = (ProcedureColumn)tempResult.elementAt(i);
        }
    }
    catch (SQLException ex) {
        try { rs.close( ); } catch (SQLException e) { }
        getConnectionManager( ).releaseAfterException(conHandle);
        throw new ErrorDuringQuery(ex.getErrorCode( ), ex.toString( ));
    }
    try { rs.close( ); }
    catch (SQLException ex) {
        getConnectionManager( ).releaseAfterException(conHandle);
        return result;
    }
    getConnectionManager( ).releaseConnectionHandle(conHandle);
    return result;
}
public
String[ ] get_catalogs(ConnectionInfo connectionInfo)
    throws ConnectionError, ErrorDuringQuery
{
    String[ ] result = null;
    ConnectionHandle conHandle = null;
    ResultSet rs = null;
    Vector tempResult;
    DatabaseMetaData md;
    boolean reTry = true;
    int retryCount = 0;
    QORuntime.initUrl(connectionInfo, defaultUrl);
    do {
        try {
            conHandle = getConnectionManager( ).getConnectionHandle(connectionInfo);
        }
        catch (ConnectionError ex ) {
            if ( retryCount < getConnectionManager( ).getMaxRetries( ) ) {
                retryCount++;
                continue;
            }
            else {
                throw ex;
            }
        }
    }
    try {
    md = conHandle.getConnection( ).getMetaData( );
    rs = md.getCatalogs( );
```

-continued

```
        }
        catch (SQLException ex) {
            getConnectionManager( ).releaseAfterException(conHandle);
            if ( retryCount < getConnectionManager( ).getMaxRetries( ) ) {
                retryCount++;
                continue;
            }
            else {
                throw new ErrorDuringQuery(ex.getErrorCode( ), ex.toString( ));
            }
        }
        reTry = false;
    } while (reTry);
    try {
        tempResult = new Vector(10, 10);
        while ( rs.next( ) ) {
            String table_type = rs.getString(1).trim( );
            tempResult.addElement(table_type);
        }
        result = new String[ tempResult.size( ) ];
        for (int i = 0; i < tempResult.size( ); i++) {
            result[i] = (String)tempResult.elementAt(i);
        }
    }
    catch (SQLException ex) {
        try { rs.close( ); } catch (SQLException e) { }
        getConnectionManager( ).releaseAfterException(conHandle);
        throw new ErrorDuringQuery(ex.getErrorCode( ), ex.toString( ));
    }
    try { rs.close( ); }
        catch (SQLException ex) {
            getConnectionManager( ).releaseAfterException(conHandle);
            return result;
        }
    getConnectionManager( ).releaseConnectionHandle(conHandle);
    return result;
}
public
String[ ] get_schemas(ConnectionInfo connectionInfo)
    throws ConnectionError, ErrorDuringQuery
{
    String[ ] result = null;
    ConnectionHandle conHandle = null;
    ResultSet rs = null;
    Vector tempResult;
    DatabaseMetaData md;
    boolean reTry = true;
    int retryCount = 0;
    QORuntime.initUrl(connectionInfo, defaultUrl);
    do {
        try {
            conHandle = getConnectionManager( ).getConnectionHandle(connectionInfo);
        }
        catch (ConnectionError ex ) {
            if ( retryCount < getConnectionManager( ).getMaxRetries( ) ) {
                retryCount++;
                continue;
            }
            else {
                throw ex;
            }
        }
        try {
            md = conHandle.getConnection( ).getMetaData( );
            rs = md.getSchemas( );
        }
        catch (SQLException ex) {
            getConnectionManager( ).releaseAfterException(conHandle);
            if ( retryCount < getConnectionManager( ).getMaxRetries( ) ) {
                retryCount++;
                continue;
            }
            else {
                throw new ErrorDuringQuery(ex.getErrorCode( ), ex.toString( ));
            }
        }
        reTry = false;
    } while(reTry);
    try {
```

```
            tempResult = new Vector(10, 10);
            while ( rs.next( ) ) {
                String table_type = rs.getString(1).trim( );
                tempResult.addElement(table_type);
            }
            result = new String[ tempResult.size( ) ];
            for (int i = 0; i < tempResult.size( ); i++) {
                result[i] = (String)tempResult.elementAt(i);
            }
        }
    catch (SQLException ex) {
        try { rs.close( ); } catch (SQLException e) { }
        getConnectionManager( ).releaseAfterException(conHandle);
        throw new ErrorDuringQuery(ex.getErrorCode( ), ex.toString( ));
    }
    try { rs.close( ); }
    catch (SQLException ex) {
        getConnectionManager( ).releaseAfterException(conHandle);
        return result;
    }
    getConnectionManager( ).releaseConnectionHandle(conHandle);
    return result;
}
public
Query parse_SQL_query(ConnectionInfo connectionInfo,
                        String query,
                        String[ ] inputTypes)
    throws ConnectionError, ErrorDuringQuery
{
    Query result = null;
    ConnectionHandle conHandle = null;
    CallableStatement stmt = null;
    ResultSet rs = null;
    int updateCount = 0;
    Vector tempResult;
    DatabaseMetaData md;
    // No retries here since users may routinely type in invalid queries,
    // and we don't want to be overly slow in that case.
System.out.println("SAQO: Parsing query");
    QORuntime.initUrl(connectionInfo, defaultUrl);
System.out.println("SAQO: Getting conHandle");
    conHandle = getConnectionManager( ).getConnectionHandle(connectionInfo);
    result = new Query( );
    result.query_type = "INVALID_QUERY";
    result.error_message =" ";
    result.query_columns = new QueryColumn[0];
    result.procedure_inputs = new QueryColumn[0];
    try {
        conHandle.getConnection( ).setAutoCommit(false);
System.out.println("SAQO: Creating statement");
        stmt = conHandle.getConnection( ).prepareCall(query);
        // We have to execute to be sure that the query got parsed for
        // correctness, since some drivers don't do that in prepare, but
        // we must prevent the query from modifying the database during
        // this test.
        // The execute might not work if the default argument values
        // for the type are invalid (e.g., cause a constraint violation).
System.out.println("SAQO: Setting parameters");
        for (int i=1; i<=inputTypes.length; i++) {
            setInputParameter(stmt, i, inputTypes[i-1]);
        }
System.out.println("SAQO: Executing query");
        stmt.execute( );
    }
    catch (SQLException ex) {
System.out.println("SAQO: Catching exception while parsing query");
        result.error_message = ex.getMessage( );
        if (result.error_message == null)
            result.error_message = "Unknown error";
        try {
            conHandle.getConnection( ).rollback( );
            conHandle.getConnection( ).setAutoCommit(true);
        }
        catch (SQLException ex2) { }
System.out.println("SAQO: releasing conHandle while catching exception while parsing query");
        getConnectionManager( ).releaseConnectionHandle(conHandle);
        return result;
    }
```

-continued

```
        try {
System.out.println("SAQO: calling getResultSet");
            rs = stmt.getResultSet( );
            if (rs != null) {
                // we have a result
System.out.println("SAQO: Have a result set");
                ResultSetMetaData rsmd = rs.getMetaData( );
                QueryColumn qcs[ ] = new QueryColumn[rsmd.getColumnCount( )];
                for (int i=0; i<qcs.length; i++) {
                    qcs[i] = new QueryColumn(rsmd.getColumnName(i+1),
                                rsmd.getTableName(i+1),
                                rsmd.getSchemaName(i+1),
                                rsmd.getCatalogName(i+1),
                                convertDataType(rsmd.getColumnType(i+1)),
                                rsmd.getColumnTypeName(i+1),
                                rsmd.getPrecision(i+1),
                                rsmd.getScale(i+1));
                }
                result.query_type = "SELECT_QUERY";
                result.query_columns = qcs;
                // We cannot handle more than one result set or mixed select/update
                if (stmt.getMoreResults( ) || stmt.getUpdateCount( ) != -1) {
                    result.error_message = "Query produces more than one result set";
                    result.query_type = "INVALID_QUERY";
                }
            }
            else if ( (updateCount = stmt.getUpdateCount( )) != -1) {
System.out.println("SAQO: have an update count");
                // we have an update count
                result.query_type = "STORED_PROCEDURE_QUERY";
                //rs = stmt.getResultSet( );
                //updateCount = stmt.getUpdateCount( );
                // We cannot handle more than one result set or mixed select/update
                // The following is supposed to be valid, but causes a
                // "Function sequence error" using the Intersolv Dblib driver
                //if (stmt.getMoreResults( ) || stmt.getUpdateCount( ) != -1) {
                //    result.error_message = "Query produces more than one result set";
                //    result.query_type "INVALID_QUERY";
                //}
            }
            else {
System.out.println("SAQO: Neither result set or update count");
                result.error_message = "Query does not select or update data";
                result.query_type = "INVALID_QUERY";
            }
        }
        catch (SQLException ex) {
            throw new ErrorDuringQuery(ex.getErrorCode( ), ex.toString( ));
            // Above causes finally to execute
        }
        finally {
            try {
                stmt.close( );
                conHandle.getConnection( ).rollback( );
                conHandle.getConnection( ).setAutoCommit(true);
            } catch (SQLException ex) { }
System.out.println("SAQO: Releasing conHandle while in finally getting resultSet");
            getConnectionManager( ).releaseConnectionHandle(conHandle);
        }
        return result;
}
public
void ping(QueryObject.ConnectionInfo connectionInfo)
    throws ConnectionError, ErrorDuringQuery
{
    get_schemas(connectionInfo);
}
public
void do_query(QueryObject.ConnectionInfo connectionInfo, String query)
    throws ConnectionError, ErrorDuringQuery
{
    Statement stmt = null;
    ConnectionHandle conHandle = null;
    boolean reTry = true;
    int retryCount = 0;
    QORuntime.initUrl(connectionInfo, defaultUrl);
    do {
        try {
            conHandle = getConnectionManager( ).getConnectionHandle(connectionInfo);
```

-continued

```
            }
            catch (ConnectionError ex ) {
                if ( retryCount < getConnectionManager( ).getMaxRetries( ) ) {
                    retryCount++;
                    continue;
                }
                else {
                    throw ex;
                }
            }
            try {
                stmt = conHandle.getConnection( ).createStatement( );
            }
            catch (SQLException ex) {
                getConnectionManager( ).releaseAfterException(conHandle);
                if ( retryCount < getConnectionManager( ).getMaxRetries( ) ) {
                    retryCount++;
                    continue;
                }
                else {
                    throw new ErrorDuringQuery(ex.getErrorCode( ), ex.toString( ));
                }
            }
            try {
                stmt.executeQuery( query );
            }
            catch (SQLException ex) {
                try { stmt.close( ); } catch (SQLException e) { }
                getConnectionManager( ).releaseAfterException(conHandle);
                if ( retryCount < getConnectionManager( ).getMaxRetries( ) ) {
                    retryCount++;
                    continue;
                }
                else {
                    throw new ErrorDuringQuery(ex.getErrorCode( ), ex.toString( ));
                }
            }
            reTry = false;
        } while (reTry);
        try { stmt.close( ); }
        catch (SQLException ex) {
            getConnectionManager( ).releaseAfterException(conHandle);
            return;
        }
        getConnectionManager( ).releaseConnectionHandle(conHandle);
}
private
String convertDataType( int dataType ) {
    String result;
    switch (dataType) {
    case Types.BIT:         result = "BIT";        break;
    case Types.TINYINT:     result = "TINYINT";    break;
    case Types.SMALLINT:    result = "SMALLINT";   break;
    case Types.INTEGER:     result = "INTEGER";    break;
    case Types.BIGINT:      result = "BIGINT";     break;
    case Types.FLOAT:       result = "FLOAT";      break;
    case Types.REAL:        result = "REAL";       break;
    case Types.DOUBLE:      result = "DOUBLE";     break;
    case Types.NUMERIC:     result = "NUMERIC";    break;
    case Types.DECIMAL:     result = "DECIMAL";    break;
    case Types.CHAR:        result = "CHAR";       break;
    case Types.VARCHAR:     result = "VARCHAR";    break;
    case Types.LONGVARCHAR: result = "LONGVARCHAR"; break;
    case Types.DATE:        result = "DATE";       break;
    case Types.TIME:        result = "TIME";       break;
    case Types.TIMESTAMP:   result = "TIMESTAMP";  break;
    case Types.BINARY:      result = "BINARY";     break;
    case Types.VARBINARY:   result = "VARBINARY";  break;
    case Types.LONGVARBINARY: result = "LONGVARBINARY"; break;
    case Types.NULL:        result = "ILLEGAL";    break;
    default: result = "ILLEGAL";   break;
    }
    return result;
}
private
String convertColumnType( short columnType) {
    String result = null;
    switch (columnType) {
    case DatabaseMetaData.procedureColumnUnknown:
```

```
        default:
            result = "UNKNOWN"; break;
        case DatabaseMetaData.procedureColumnIn:
            result "IN"; break;
        case DatabaseMetaData.procedureColumnInOut:
            result= "INOUT"; break;
        case DatabaseMetaData.procedureColumnOut:
            result = "OUT"; break;
        case DatabaseMetaData.procedureColumnReturn:
            result = "RETURN"; break;
        case DatabaseMetaData.procedureColumnResult:
            result = "RESULT"; break;
        }
        return result;
}
private
void setInputParameter(CallableStatement stmt, int i, String type)
        throws SQLException
{
    if (type.equalsIgnoreCase("BIT"))
        { stmt.setBoolean(i, false); }
    else if (type.equalsIgnoreCase("TINYINT"))
        { stmt.setByte(i, (byte)0); }
    else if (type.equalsIgnoreCase("SMALLINT"))
        { stmt.setShort(i, (short)0); }
    else if (type.equalsIgnoreCase("INTEGER"))
        { stmt.setInt(i, 0); }
    else if (type.equalsIgnoreCase("BIGINT"))
        { stmt.setLong(i, 0L); }
    else if (type.equalsIgnoreCase("FLOAT"))
        { stmt.setDouble(i, 0.0); }
    else if (type.equalsIgnoreCase("REAL"))
        { stmt.setFloat(i, 0.0F); }
    else if (type.equalsIgnoreCase("DOUBLE"))
        { stmt.setDouble(i, 0.0); }
    else if (type.equalsIgnoreCase("NUMERIC"))
        { stmt.setNumeric(i, defaultNumeric); }
    else if (type.equalsIgnoreCase("DECIMAL"))
        { stmt.setNumeric(i, defaultNumeric); }
    else if (type.equalsIgnoreCase("CHAR"))
        { stmt.setString(i, " "); }
    else if (type.equalsIgnoreCase("VARCHAR"))
        { stmt.setString(i, " "); }
    else if (type.equalsIgnoreCase("LONGVARCHAR"))
        { stmt.setString(i, " "); }
    else if (type.equalsIgnoreCase("DATE"))
        { stmt.setDate(i, defaultDate); }
    else if (type.equalsIgnoreCase("TIME"))
        { stmt.setTime(i, defaultTime); }
    else if (type.equalsIgnoreCase("TIMESTAMP"))
        { stmt.setTimestamp(i, defaultTimestamp); }
    else if (type.equalsIgnoreCase("BINARY"))
        { stmt.setBytes(i, defaultBytes); }
    else if (type.equalsIgnoreCase("VARBINARY"))
        { stmt.setBytes(i, defaultBytes); }
    else if (type.equalsIgnoreCase("LONGVARBINARY"))
        { stmt.setBytes(i, defaultBytes); }
}
/* private static DBQueryImplToOrbAPI DBQueryImplToOrb = null; */
private static ConnectionManager connectionManager = null;
private static Numeric defaultNumeric = new Numeric("0.0");
private staticjava.sql.Date defaultDate = newjava.sql.Date(93, 1, 16);
private static Time defaultTime = new Time(0, 0, 0);
private static Timestamp defaultTimestamp =
    new Timestamp(93, 1, 16, 0, 0, 0, 0);
private static byte[ ] defaultBytes = new byte[0];
private String defaultUrl = null;
}
```

As shown, the implemented schema access object has methods for returning tables types (get_table_types( )), tables (get_tables( )), procedures (get_procedures( )), get_table_columns( )), procedure columns (get_procedure_columns( )), catalogs (get_catalogs( )), schemas (get_schemas( )). The parse_SQL_query( ) method parses the SQL query entered by the developer, connects to the database, executes the query obtains the result set, and rolls back the transaction to prevent a modification of the database. Its operation is described in more detail with respect to FIG. 9 below. The do_query( ) method actually performs the query. Finally, the convertDataType( ), convertColumType( ) and setInputparameter( ) methods perform data conversion.

Figure 6:
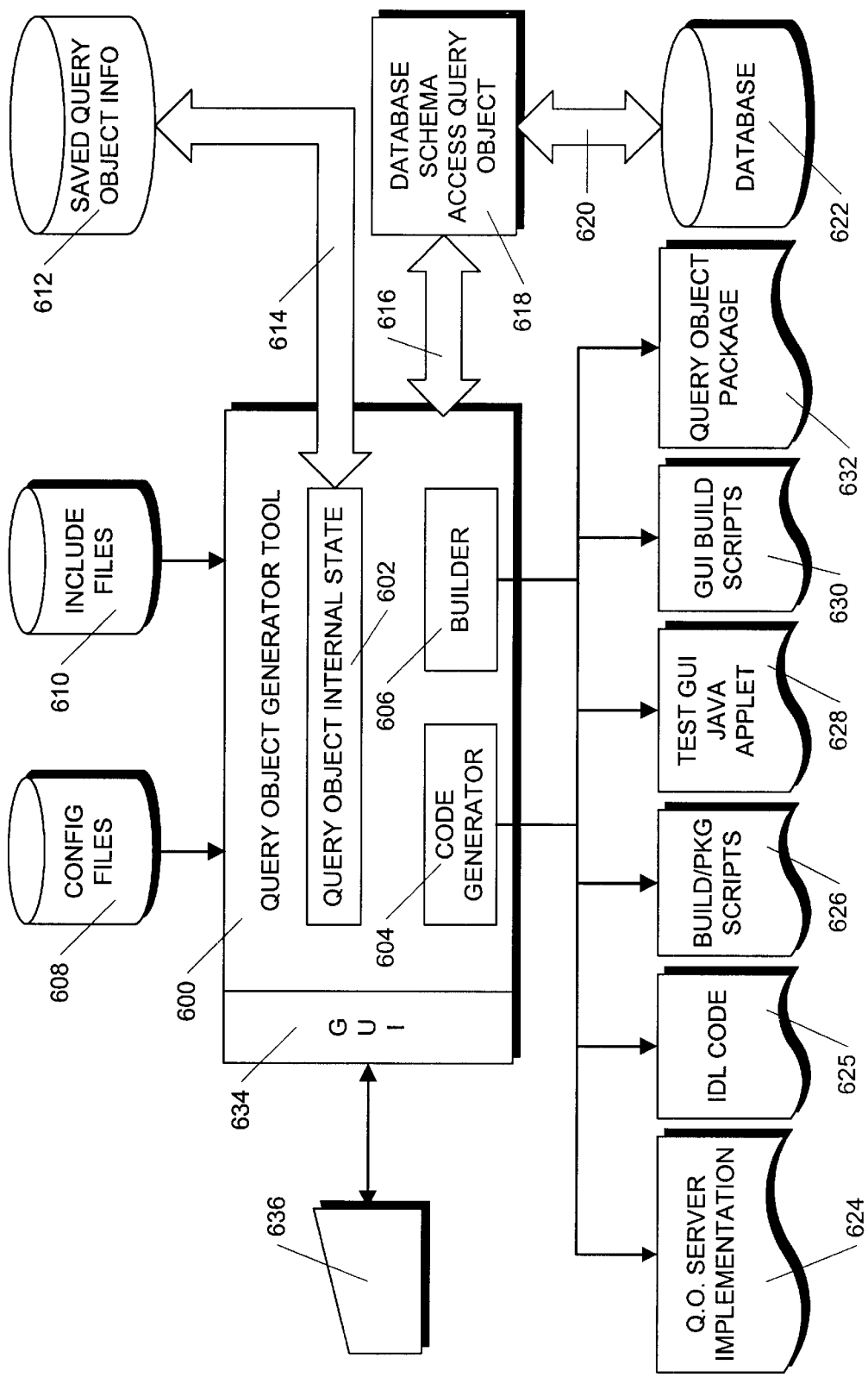
FIG. 6 illustrates the internal architecture of an illustrative query object generator tool.

The internal architecture of the query object generator tool which can be used to generate a database schema access object and which interacts with the object is illustrated in block schematic diagram form in FIG. 6. The query object generator tool 600 comprises a query object internal state object 602, code generator object 604 and a builder object 606. The query object internal state object 602 allows the user to save a logical definition of a query object in an intermediate file, such as file 612. In particular, object 602 can store and retrieve file information in file 612 as indicated schematically by arrow 614. The information saved in file 612 is not the entire query object but is sufficient amount of information to be able to reconstruct the query object. This allows the user to open an existing query object for modification without having to restart from the beginning.

The query object internal state object 602 is actually a collection of objects which model input parameters, result structures and various implementation options. The query object generator tool 600 may optionally include a graphic user interface 634 which enables a user, at terminal 636, to operate interactively with the generator tool 600.

Generator tool 600 also receives information from the database 622 in order to allow the user to formulate the query and test the query. Extracting information from, the database 622 can be performed in several manners. Preferably, generator tool 600 uses the inventive database schema access object 618 to retrieve the schema of the underlying database 622 as indicated schematically by arrow 620. The schema information is returned to generator tool 600 as indicated by arrow 616 and may be presented graphically to the user by means of the GUI 634 on terminal 636. The schema information assists the user in formulating a query.

The generator 600 also receives input information from the configuration file 608 and include files 610. The tool 600 reads the configuration files 608 when it starts up. These files tell the tool 600 about the environment in which it is running and they include such information as the JDBC drivers that are available and the location of various software programs. The configuration files also contain the name of the include directory 610 which contains various "boilerplate" files. When the tool 600 starts up, it first tries to read the configuration file in a directory that is "hard coded" into the tool. If the configuration file is not found, the tool then looks for a configuration file in the user's home directory. If the file is still not found, the tool looks in the current directory.

Generator tool 600 may further receive query strings and parameter information from the user, via terminal 636. After the input information has been received, the query object generator tool 600 utilizes an appropriately selected code generator 604 to generate the source code which implements the query object. In particular, the code generator 604 generates the query object server implementation 624 and the query object IDL code 625 and, as mentioned above, may optionally generate a database schema access server implementation and IDL code. The code generator object which is actually used to generate specific query object source code must generate code which is compatible with the underlying database and is also written in the implementation language which is used to implement the CORBA server. Accordingly, the code generator classes are arranged in a class hierarchy with subclasses that depend on the implementation language and the underlying DBMS language.

In addition, the tool 600 may also generate build and package scripts 626 which can be used to build the objects from the source code 624 and the IDL code 625. The source code and the build scripts are provided to a builder object 606 which generates the final query object package 632 that can be installed on a CORBA server. As previously described, the query object IDL interface code 625 is provided to a conventional IDL compiler to generate the client stub code and server skeleton code.

The database schema access object can be used retrieve information from the underlying database to perform a browsing function. One way to use the schema access object is in a browsing routine which uses the object to retrieve the database details and display the details on a graphic screen display. Illustrative source code for an object which performs a browsing function is shown in the code snippet below which implements a browsing object named DBSchema:

```
/*
 * DbSchema.java
 *
package GOLD.GUI;
//import sunw.corba.*;
//import sunw.neo.*;
import java.util.*;
import org.omg.CosNaming.*;
import org.omg.CORBA.*;
import GOLD.SchemaAccessModule.*;
import GOLD.Internals.*;
import GOLD.QoLib.*;
import QueryObject.*;
import sunw.neo.admin.standard.*;
import sunw.neo.admin.custom.*;
public class DbSchema {
    String datasrc_name;
    String user_name;
    String password;
    public static ORB orb = null;
    public static NamingContext namingContext = null;
    public static DBQuery qo;
    public static ConnectionInfo dbconn = null;
    DbSchema() {
        try {
            orb = ORB.init();
        } catch (Exception e) {
```

-continued

```
            throw new RuntimeException("Error initializing ORB: " +
                    e.getMessage());
        }
        try {
            org.omg.CORBA.Object obj =
orb.resolve_initial_references("NameService");
            namingContext = NamingContextHelper.narrow(obj);
            NameComponent name = new NameComponent("DBQuery","");
            NameComponent path[] = {name};
            qo = DBQueryHelper.narrow(namingContext.resolve(path));
        } catch (Exception e) {
            throw new RuntimeException("Error finding DBQuery: " +
                    e.toString());
        }    }
    void login(String datasrc, String user, String passwd) {
        datasrc_name = datasrc;
        user_name = user;
        password = passwd;
        try {
            dbconn = new ConnectionInfo(datasrc_name, user_name, password);
            qo.ping(dbconn);
    } catch (Exception e) {
            throw new RuntimeException("System failure: " + e);
        }
    }
    void get_objects(MulticolumnList list) {
        Table[] data;
        String types[] = new String[0];
        String columnText[] = new String[1];
        try {
            data = qo.get_tables(dbconn, "", "%", "%", types);
    } catch (QueryObject.ConnectionError e) {
            throw new RuntimeException(e.toString() + ": " + e.details);
    } catch (QueryObject.ErrorDuringQuery e) {
            throw new RuntimeException(e.toString());
        } catch (Exception e) {
            throw new RuntimeException("System failure: " + e);
        }
        for (int i = 0; i < data.length; i++){
            columnText[0] = data[i].table_name;
            list.addItem(columnText);
        }
    }
    void get_procedures(MulticolumnList list) {
        Procedure[] data;
        String columnText[] = new String[1];
        try {
            data = qo.get_procedures(dbconn, "", "%", "%");
    } catch (QueryObject.ConnectionError e) {
            throw new RuntimeException(e.toString() + ": " + e.details);
    } catch (QueryObject.ErrorDuringQuery e) {
            throw new RuntimeException(e.toString());
        } catch (Exception e) {
            throw new RuntimeException("System failure: " + e);
        }
        for (int i = 0; i < data.length; i++){
            columnText[0] = data[i].procedure_name;
            list.addItem(columnText);
        }
    }
    void get_columns(MulticolumnList list, String objname) {
        TableColumn[] data;
        String columnText[] = new String[2];
        try {
            data = qo.get_table_columns(dbconn, "", "%", objname, "%");
        } catch (Exception e) {
            throw new RuntimeException("System failure: " + e);
        }
        for (int i = 0; i < data.length; i++){
            columnText[0] = data[i].column_name;
            columnText[1] = data[i].type_name;
            list.addItem(columnText);
        }
    }
    void get_procedure_columns(MulticolumnList list, String objname) {
        ProcedureColumn[] data;
        String columnText[] = new String[2];
        try {
            data = qo.get_procedure_columns(dbconn, "", "%", objname, "%");
```

```
        } catch (Exception e) {
            throw new RuntimeException("System failure: " + e);
        }
        for (int i = 0; i < data.length; i++){
            columnText[0] = data[i].column_name;
            columnText[1] = data[i].type_name;
            list.addItem(columnText);
        }
    }
}
```

Figure 7:
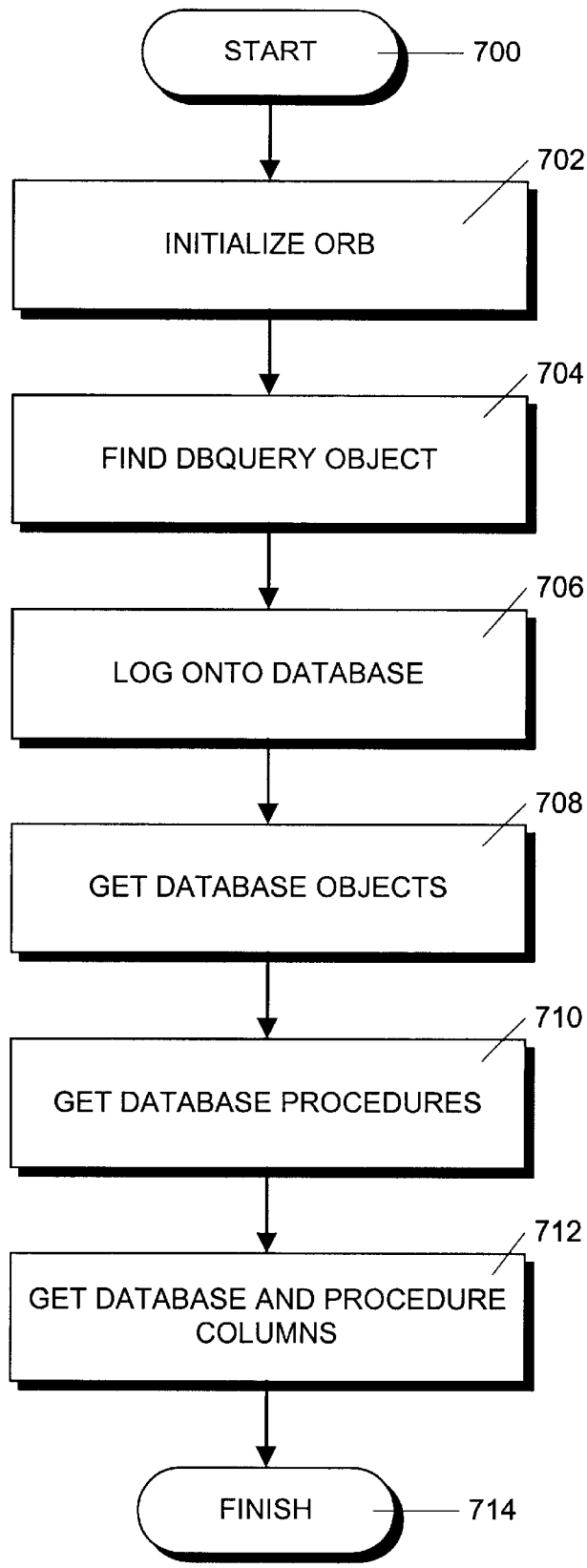
FIG. 7 is a flowchart illustrating a routine which retrieves database information.

The browsing routine implemented by this object is shown in FIG. 7. The routine begins in step 700 and proceeds to step 702 where the CORBA ORB is created and initialized. Next, in step 704, the ORB naming services are used to locate the DBQuery database schema access object. In step 706, the routine logs onto the appropriate database. The login routine involves establishing a new connection to the DBQuery object and using the Ping( ) method in the object to check the database connection.

Next, in steps 708, 710 and 712, the routine obtains the database objects, the database procedures and the database and procedure columns, respetively. The database objects are obtained by calling the get_tables( ) method in the DBQuery object and returning the resulting names to a text column. The database procedures are retrieved by calling the get_procedures( ) method in the DBQuery object and the columns are retrieved by calling the get_table_columns( ) and get_procedure_columns( ) methods in the DBQuery object. The routine then ends in step 714.

Figure 8:
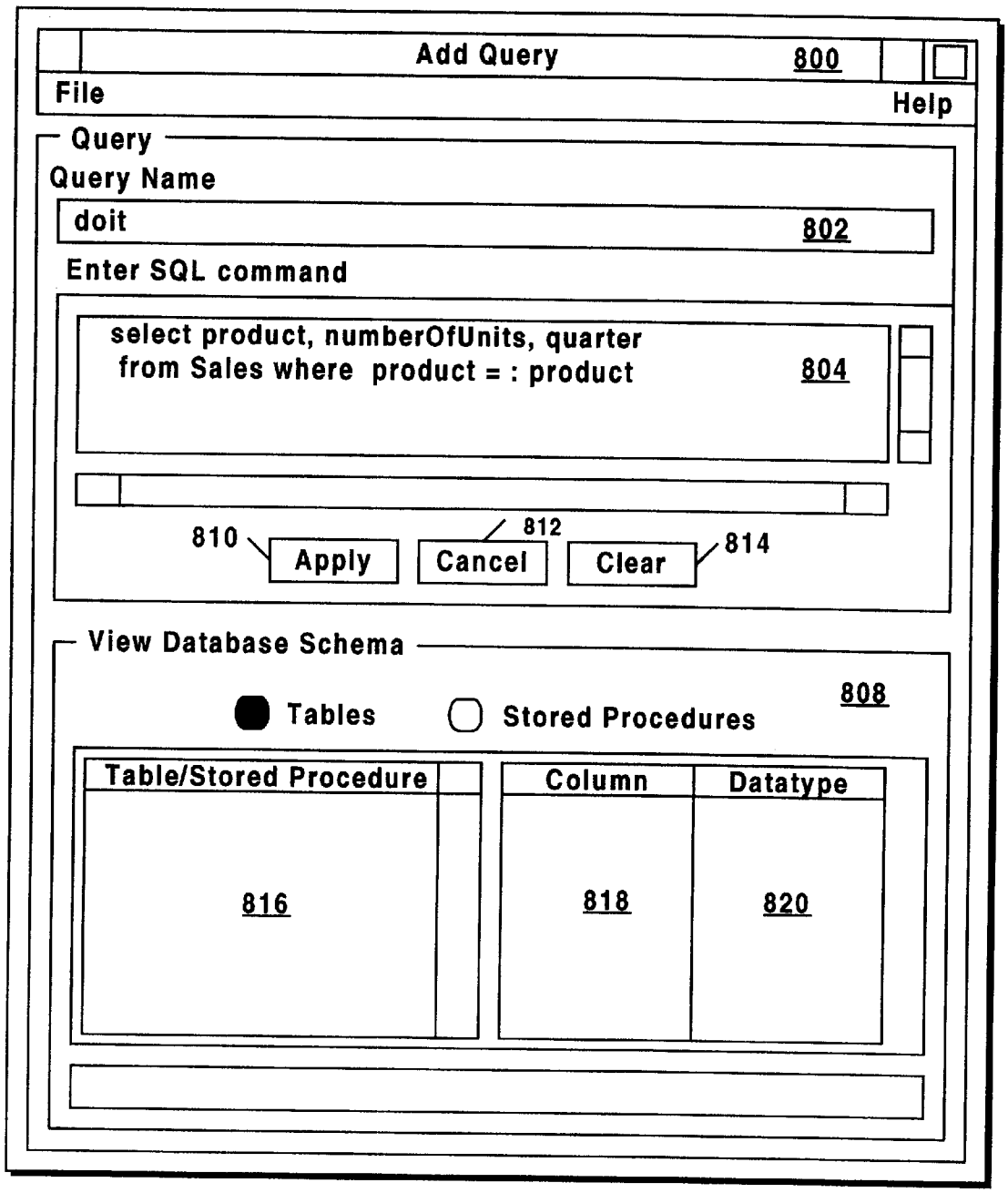
FIG. 8 is a screen display illustrating the display of database schema information retrieved by the inventive database schema access object.

The resulting data can be displayed in graphic format as shown in FIG. 8. The query object generator tool is much like any other editing program which allows a user to define and examine one or more query objects, change their definitions and manipulate them in various ways. The query objects are selected by using a graphic user interface which has a menu of operations and shows the state of the current query object being defined. The menu options might include such options as "New" which would allow a new query object to be created. Another menu options might be "Open" which would allow an existing query object to be restored from an intermediate file. a "Save" option would allow the query object contents to be stored in the intermediate file.

Each query object contains one or more queries which are also displayed on the graphic display. The queries can be manipulated by other menu options. These options might include such operations as "Add Query", "Delete Query" and "Modify Query".

Selection of the "Add Query" option brings up the screen shown in FIG. 8. The Add Query screen 800 contains a text field 802 Which allows entry of a query name and a text field 804 which allows entry of the SQL query text.

The database schema area 808 displays details of the database schema which have been previously retrieved by means of a database schema access query object or in another manner as previously described. The display consists of a scrolling list 816 of tables, views and stored procedures. When one of these database "objects" is selected, its schema description, including column names 818 and data types 820 can be displayed. The schema display assists a user in correctly constructing the query string in text box 804.

After the SQL query string has been constructed in text box 804, the user can press the, "Apply" command button 810 which saves the query. The user can use the "Cancel" button 812 to cancel the add query object operation or the "Clear" button 814 which clears the contents of the text fields 802 and 804.

Figure 9:
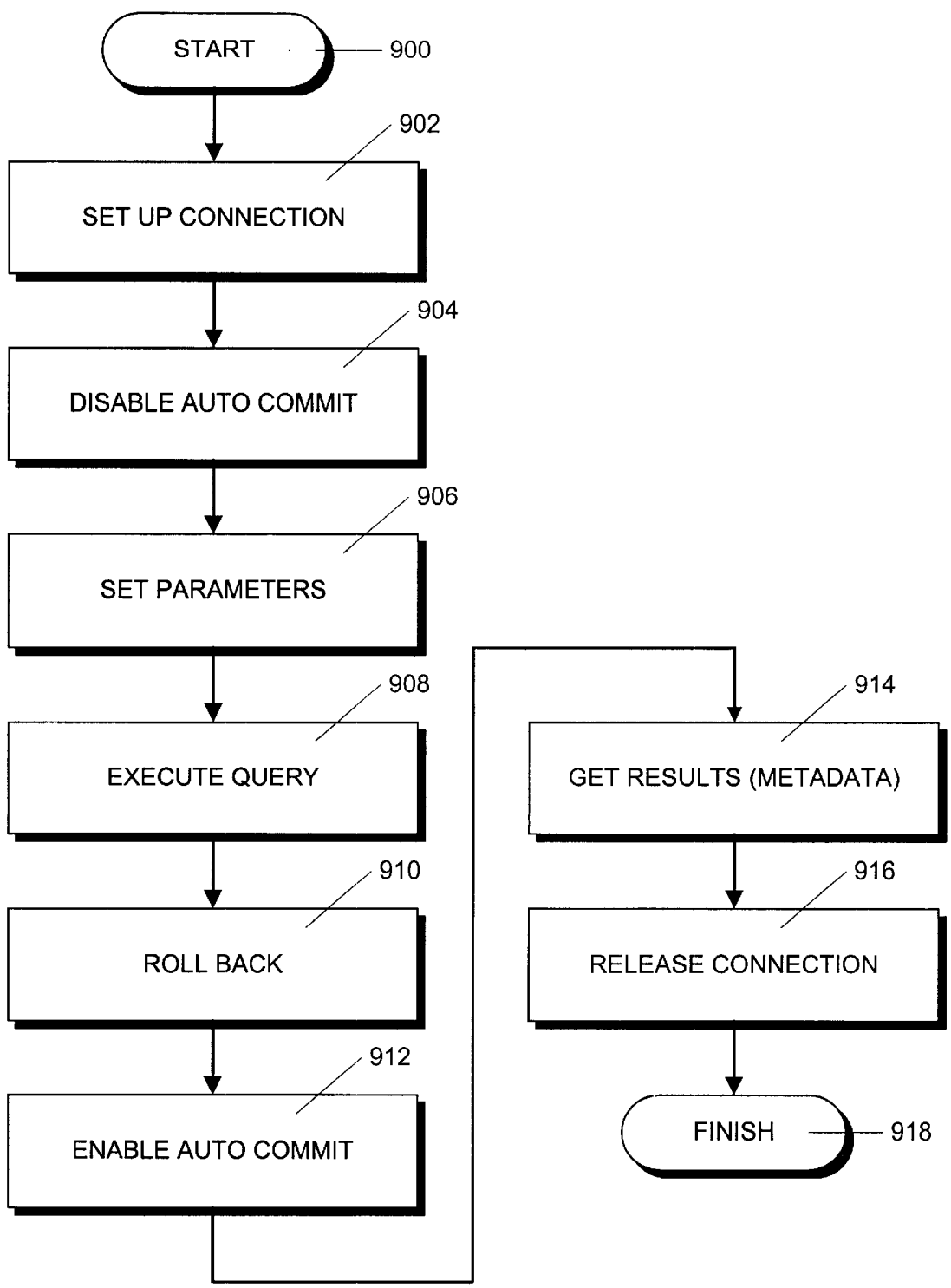
FIG. 9 is a flowchart illustrating the steps involved in validating an SQL query.

FIG. 9 illustrates a routine by which a query entered by the user is checked and validated using a method in the inventive database schema access object using a method, such as the parse_SQL_query( ) method described above. This routine starts in step 900 and proceeds to step 902 where a connection is created to the underlying database. This connection can be set up using a conventional method. For example, In the case of a JDBC compliant database, the connection can be created by instantiating a connection object.

Next, in step 904, if the database utilizes an "auto commit" feature, this is disabled to prevent the query from actually modifying data in the database. Such modification would not be appropriate, since the purpose of the method is to validate the query for later use, rather than to apply it against a valid database while the tool is in use. At this point the query entered by the user (for example, an SQL query) would be prepared for execution by, for example, calling the prepareCall( ) method in the aforementioned connection object. However, the query must still be, executed to insure that it is parsed by the DBMS engine for correctness, since some DBMS drivers do not parse the query in the prepare phase. Accordingly, in step 906, parameters for the query are set and, in step 908, the query is executed.

As previously mentioned, in order to prevent the query from modifying data, in step 910, a rollback operation is automatically executed and, in step 912, the auto commit function, if available, is re-enabled.

Next, in step 914, the results are obtained from the query which results are displayed on a display screen illustrated in FIG. 8. In step 916, the connection to the database is released and the routine ends in step 918.

Figure 10:
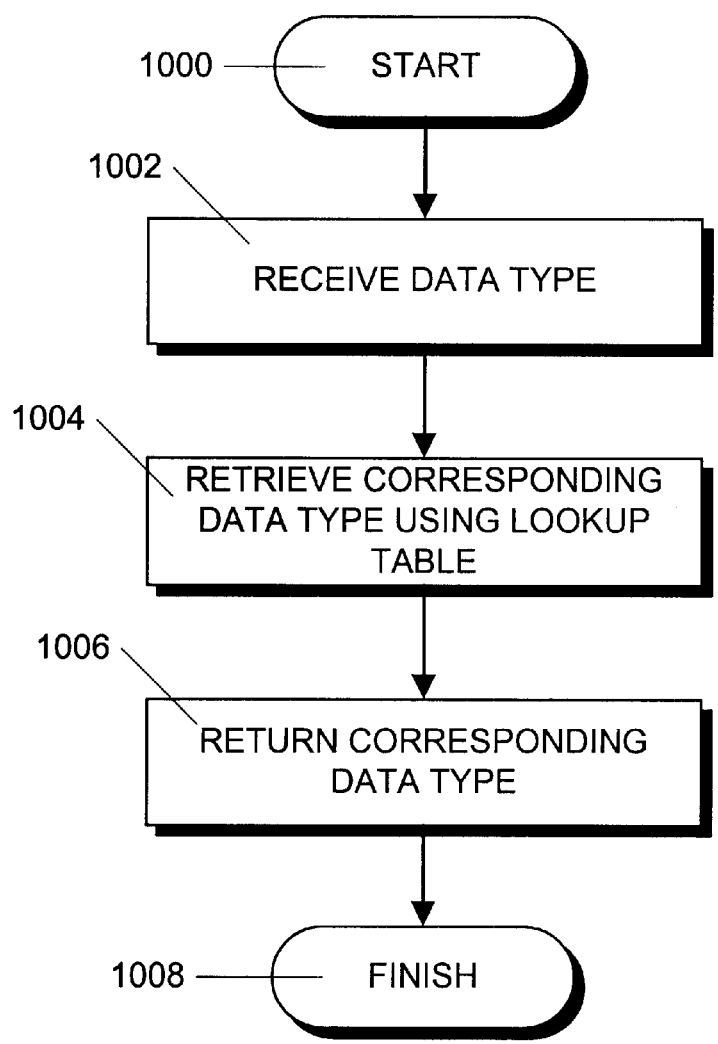
FIG. 10 is a flowchart illustrating the steps involved in translating data types.

FIG. 10 illustrates the operation of routine in which SQL data types are replaced by the underlying DBMS data types using a method such as the convertDataType( ) method described above. In particular, the routine starts in step 1000 and proceeds to step 1002 in Which the SQL data type is received from a parsing routine which parses the user-entered SQL query. Next, in step 1004, the corresponding DBMS data type is retrieved using a lookup mechanism such as a lookup table. In step 1006, the corresponding DBMS data type is returned and the routine ends in step 1008.

A software implementation of the above-described embodiment may comprise a series of computer instructions either fixed on a tangible medium, such as a computer readable media, e.g. a diskette, a CD-ROM, a ROM memory, or a fixed disk, or transmissible to a computer system, via a modem or other interface device over a medium. The medium can be either a tangible medium, including, but not limited to, optical or analog communications lines, or may be implemented with wireless techniques, including but not limited to microwave, infrared or other transmission techniques. It may also be the Internet. The series of computer instructions embodies all or part of the functionality previously described herein with respect to the invention Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product maybe distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Interment or World Wide Web.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, although the description was directed to a particular hardware system and operating system, other hardware and operating system software could be used in the same manner as that described. Other aspects, such as the specific instructions utilized to achieve a particular function, as well as other modifications to the, inventive concept are intended to be covered by the appended claims.

What is claimed is:

1. A system operable in a computer having a memory for displaying to a user database schema information of a database having metadata describing the database schema, the system comprising:
   a database schema access object in the memory having database specific methods for connecting to the database and for retrieving the metadata;
   a database independent browsing object which calls the methods in the database schema access object to retrieve the metadata and format the metadata as database independent information; and
   a display mechanism for displaying the database independent information to the user.

2. A system according to claim 1 wherein the database independent information is textual information.

3. A system according to claim 1 wherein the display mechanism is a graphical display mechanism.

4. A system according to claim 1 wherein the database schema access object includes a method for retrieving metadata describing database objects.

5. A system according to claim 1 wherein the database schema access object includes a method for retrieving metadata describing database procedures.

6. A system according to claim 1 wherein the database schema access object includes a method for retrieving metadata describing database column information.

7. A system according to claim 1 wherein the database schema access object includes a method for submitting a query to the database for validating the query syntax.

8. A system according to claim 7 wherein the method for submitting a query to the database comprises a mechanism for performing a rollback of changes made to the database by the query.

9. A system according to claim 1 wherein the database schema access object includes a method for translating data types between SQL data types and database specific data types.

10. A system according to claim 1 wherein the database browsing object includes a method for connecting to the database schema access object.

11. A system according to claim 9 wherein the database schema access object includes a method for checking a connection between the database browsing object and the database schema access object.

12. A method operable in a computer having a memory for displaying to a user database schema information of a database having metadata describing the database schema, the method comprising the steps of:
   (a) creating a database schema access object in the memory having database specific methods for connecting to the database and for retrieving the metadata;
   (b) creating a database independent browsing object which calls the methods in the database schema access object to retrieve the metadata and format the metadata as database independent information; and
   (c) displaying the database independent information to the user.

13. A method according to claim 12 wherein the database independent information is textual information.

14. A method according to claim 12 wherein step (c) comprises the step of:
   (c1) displaying the database independent information graphically to the user.

15. A method according to claim 12 wherein the database schema access object includes a method for retrieving metadata describing database objects.

16. A method according to claim 12 wherein the database schema access object includes a method for retrieving metadata describing database procedures.

17. A method according to claim 12 wherein the database schema access object includes a method for retrieving metadata describing database column information.

18. A method according to claim 12 wherein the database schema access object includes a method for submitting a query to the database for validating the query syntax.

19. A method according to claim 18 wherein the method for submitting a query to the database comprises a method for performing a rollback of changes made to the database by the query.

20. A method according to claim 12 wherein the database schema access object includes a method for translating data types between SQL data types and database specific data types.

21. A computer program product operable in a computer having a memory for displaying to a user database schema information of a database having metadata describing the database schema, the computer program product comprising a computer usable medium having computer readable program code thereon, including:
   program class code for creating a database schema access object in the memory having database specific methods for connecting to the database and for retrieving the metadata;
   program class code for creating a database independent browsing object which calls the methods in the database schema access object to retrieve the metadata and format the metadata as database independent information; and program code for displaying the database independent information to the user.

22. A computer program product according to claim 21 wherein the database independent information is textual information.

23. A computer program product according to claim 21 wherein the program code for displaying the database independent information comprises program code for displaying the database independent information graphically to the user.

24. A computer program product according to claim 21 wherein the database browsing object includes a method for connecting to the database schema access object.

25. A computer program product according to claim 21 wherein the database schema access object includes a method for checking a connection between the database browsing object and the database schema access object.

* * * * *